(12) United States Patent
Terada et al.

(10) Patent No.: US 6,960,374 B1
(45) Date of Patent: Nov. 1, 2005

(54) BIODEGRADABLE BAG

(75) Inventors: Shigenori Terada, Shiga (JP); Jun Takagi, Tokyo (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 09/869,260

(22) PCT Filed: Oct. 23, 2000

(86) PCT No.: PCT/JP00/07399

§ 371 (c)(1),
(2), (4) Date: Jun. 27, 2001

(87) PCT Pub. No.: WO01/30571

PCT Pub. Date: May 3, 2001

(30) Foreign Application Priority Data

Oct. 27, 1999 (JP) .................. 11-305758

(51) Int. Cl.[7] .......... B65D 30/02; B65D 33/24; B32B 27/06; B32B 27/26; A44B 19/26
(52) U.S. Cl. .......... 428/35.7; 428/35.2; 428/480; 383/1; 383/61.3; 383/97; 24/415
(58) Field of Search .......... 428/35.7, 35.2, 428/480; 383/1, 61.3, 97; 24/415

(56) References Cited

U.S. PATENT DOCUMENTS

| | | | | |
|---|---|---|---|---|
| 5,018,876 A | * | 5/1991 | Mennella | .............. 383/1 |
| 5,403,897 A | * | 4/1995 | Ebato et al. | .............. 525/444 |
| 5,849,401 A | * | 12/1998 | El-Afandi et al. | .......... 428/215 |
| 5,883,199 A | * | 3/1999 | McCarthy et al. | .......... 525/437 |
| 6,107,378 A | * | 8/2000 | Imashiro et al. | ............ 524/195 |
| 6,153,276 A | * | 11/2000 | Oya et al. | .................. 428/35.2 |
| 6,417,294 B1 | * | 7/2002 | Obuchi et al. | ............... 525/450 |

FOREIGN PATENT DOCUMENTS

| JP | 8-323946 | 12/1996 |
|---|---|---|
| JP | 10-100353 | 4/1998 |
| JP | 10-146936 | 6/1998 |

OTHER PUBLICATIONS

Machine translation of JP 10-146936.*
Database WPI Section Ch, Week, 199832 Derwent Publications Ltd., London, GB; AN 1998-370524 XP002239305 & JP 10 146936 A (Mitsubishi Plastics Ind Ltd), Jun. 2, 1998, abstract.

* cited by examiner

Primary Examiner—Harold Pyon
Assistant Examiner—Chris Bruenjes
(74) Attorney, Agent, or Firm—Wenderoth, Lind & Ponack, L.L.P.

(57) ABSTRACT

The present invention provides a biodegradable bag which can be heat-sealed at low temperature, does not develop corrugation, has transparency, and has degradability in the natural environment. Laminates including a biaxially oriented film of which the major component is a polylactic acid-family polymer, and a film of which the major component is an aliphatic polyester having a predetermined structure are heat-sealed so that the biaxially oriented film of which the major component is the polylactic acid-family polymer will be an outer layer.

4 Claims, 1 Drawing Sheet

BIODEGRADABLE BAG

This application is a 371 application of PCT/JP00/07399 filed Oct. 23, 2000.

TECHNICAL FIELD

This invention relates to a biodegradable bag.

BACKGROUND ART

Plastic films that are superior in transparency and heat sealability in wide applications are required in general packaging applications, of which typical examples are bags for storing food, and in the fields of fishery, agriculture, building, medical, etc.

Transparency is normally indicated in terms of light beam transmittance, and the higher the transmittance, the more excellent the transparency. Films superior in transparency are used preferentially as packaging material because the contents can be seen from outside.

Heat sealing refers to a method in which films are superposed and joined together by heat and pressure using heating bars, heating plates, heating rolls, or the like.

Many of conventional plastic products, particularly plastic packaging materials are discarded soon after use in many cases, so that their disposal problems are pointed out. As representative general packaging plastics, polyethylene, polypropylene, polyethylene terephthalate (PET), etc. can be cited. These materials are high in calorific value produced during burning. Thus there is a fear that they may damage an incinerator during burning treatment. Further, polyvinyl chloride, which is large in the usage even now, hardly burns due to its self-extinguishing property. Also, in many cases, plastic products including such unburnable materials are buried. Due to their chemical and biological stability, they scarcely decompose and remain, so that they are causing problems such as short life of burial sites. Thus, ones that are low in calorie, decompose in the soil, and are safe are desired and many researches are being made.

As one example, there is a polylatic acid. It has a burning calory less than half that of polyethylene, and it turns to a harmless decomposed product in soil or water by the progression of hydrolysis and then by microorganisms. Currently, researches for obtaining articles formed of polylactic acids, specifically, films, sheets and bottles are being made.

But, a polylatic acid has an elongation of only 38% when pulled, and it is already known that it is a very brittle material. Thus, if it is made into a film, it is practically difficult to use without orienting. Thus, as disclosed in Japanese patent publication 9-111107, trials are being made to improve shock resistance by blending other aliphatic polyester by several parts by weight. But if such films are let to stand at a temperature slightly higher than room temperature, there was a problem that physical properties such as elongation at break and heat sealing strength change with time.

Patent publication 10-146936 proposes a bag of a biodegradable film using a laminated film which has an inner-layer film comprising a polylactic acid-family polymer and a specific aliphatic polyester, and an outer layer which is an oriented film of a polylactic acid-family polymer, and which is superior in heat sealability and transparency. But such a laminated film had a problem that it cannot be heat-sealed without applying high temperature, so that corrugation tends to develop in the outer-layer film by heat sealing.

Therefore, it is an object of this invention to provide a bag which can be heat sealed at low temperature, which does not develop corrugation and which has transparency and has degradability in natural environment.

DISCLOSURE OF THE INVENTION

In this invention, the above problem has been solved by providing a biodegradable bag comprising a laminate of a biaxially oriented film of which the major component is a polylactic acid-family polymer, and a film of which the major component is an aliphatic polyester having the structure of the formula (1) and having a crystallizing melting heat $\Delta$ Hm (J/g) of $45 \leq \Delta$ Hm $\leq 55$, the bag being made by heat-sealing the laminates so that the biaxially oriented film of which the major component is a polylactic acid-family polymer will be an outer layer.

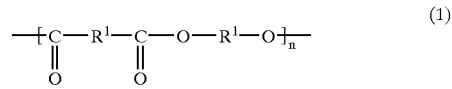

wherein $R^1$ and $R^2$ are alkylene groups or cycloalkylene groups having a carbon number of 2–10, n is the degree of polymerization necessary for the weight-average molecular weight to be 20000 to 300000. n $R^1$'s and $R^2$'s may be the same or different. Also in the formula, instead of the ester-bond residue, urethane-bond residue and/or carbonate-bond residue may be contained by up to 5% of the weight-average molecular weight.

As preferred embodiments of the present invention, a biodegradable bag wherein a zipper made of a biodegradable resin is provided at the mouth portion, and a biodegradable bag wherein the aliphatic polyester is a copolymer of which the major components are 1,4-butanediol, succinic acid, and adipic acid can be cited.

BEST MODE FOR EMBODYING THE INVENTION

Figure 1:
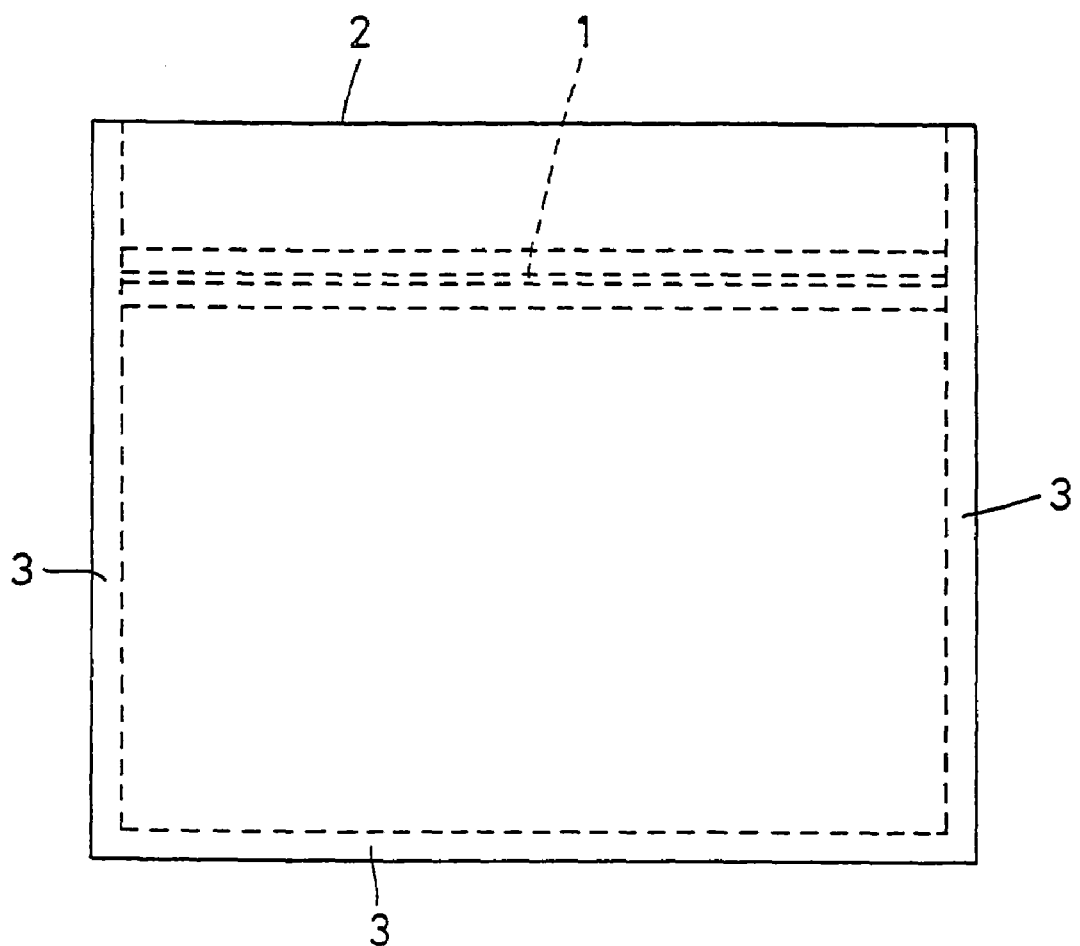
FIG. 1 is a front view showing a bag manufactured in Examples and Comparative Examples.

Hereinbelow, an embodiment of this invention will be described.

The biodegradable bag according to this invention is obtained by heat sealing laminates consisting of a biaxially oriented film of which the major component is a polylactic acid-family polymer and a film of which the major component is a predetermined aliphatic polyester, so that the former will be an outer layer.

The polylactic acid-family polymer used in the present invention is a polymer of which the major component is L-, D- or DL-lactic acid units, and may contain other hydroxy-carboxylic acid units as a small amount of copolymerizing component, and also a small amount of chain-extending agent residue.

As a polymerization method, a known method such as a condensation polymerization or a ring-opening polymerization may be used. For example, with a condensation polymerization method, it is possible to obtain a polylatic acid having a desired composition by directly dehydrated condensation polymerizing L-lactic acid, D-lactic acid or their mixture.

With ring-opening polymerization method (lactide method), it is possible to obtain a polylactic acid from a lactide, which is a cyclic dimer of a lactic acid, using a selected catalyst while using a polymerization adjusting agent as necessary.

As monomers copolymerized into the polylactic acid, bifunctional aliphatic hydroxycarboxylic acids such as optical isomers of lactic acids (D-lactic acid for L-lactic acid and L-lactic acid for D-lactic acid), glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid and 2-hydroxycaproic acid, and lactones such as caprolactone, butyrolactone and valerolactone may be used.

The preferable range of the weight-average molecular weight of the polylactic acid-family polymer used in the present invention is 60000 to 700000, more preferably 80000 to 400000, and especially preferably 100000 to 300000. If the molecular weight is too small, practical physical properties such as mechanical properties and heat resistance would scarcely reveal, while if it is too large, the melt viscosity would be too high to achieve good moldability.

The predetermined aliphatic polyester has a structure shown by the formula (1), and is a polymer of which the major components are aliphatic (including cycloaliphatic, ditto for the rest) dicarboxylic acid units and aliphatic diol units.

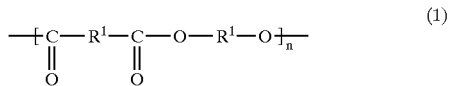

$$\mathrm{+\!\!\!\!-C\!\!-\!R^1\!\!-\!C\!\!-\!O\!\!-\!R^1\!\!-\!O\!\!\!\!-\!]_n} \quad (1)$$

In the formula, $R^1$ and $R^2$ are alkylene groups or cycloalkylene groups having a carbon number of 2 to 10. n is the degree of polymerization necessary for the weight-average molecular weight to be 20000 to 300000. n $R^1$'s or $R^2$'s may be the same or different.

Also, in the formula, instead of the ester-bond residue, urethane-bond residue and/or carbonate-bond residue may be contained by up to 5% of the weight-average molecular weight. The urethane-bond residue and carbonate-bond residue are ones by chain-extending agents.

As the aliphatic carboxylic acid component, an aliphatic dicarboxylic acid such as succinic acid, adipic acid, suberic acid, sebacic acid or dodecanoic diacid, or their anhydride or derivative may be used. On the other hand, as an aliphatic alcohol component, an aliphatic diol such as ethylene glycol, butanediol, hexanediol, octanediol, cyclopentanediol, cyclohexanediol or cyclohexane dimethanol or their derivative may be used. Any of them has preferably as its major component a bifunctional compound having alkylene groups or cycloalkylene groups having a carbon number of 2 to 10. Of course, as either of the carboxylic acid component and the alcohol component, two or more kinds may be used.

For the purpose of providing branches in the polymer in order to improve melt viscosity, carboxylic acids, alcohols or hydroxycarboxylic acids having three or more functional groups may be used. Specifically, malic acid, tartaric acid, citric acid, trimellitic acid, pyromellitic acid or a multifunctional component such as pentaerythritol or trimethylol propane may be used. If these components are used in large amounts, the polymer obtained would have a cross-linked structure, so that it may not be thermoplastic, or even if it is thermoplastic, a microgel having a partially highly cross-linked structure may be produced, so that when it is formed into a film, it may form a fisheye. Thus, the rate at which these multifunctional components are contained in the polymer should be limited to such a low level that it will not largely affect the chemical and physical properties of the polymer.

Further, as necessary, as small-amount copolymerizing components, non-aliphatic dicarboxylic acids such as terephthalic acid and/or non-aliphatic diols such as ethylene oxide additive of bisphenol A, lactic acids and/or hydroxycarboxylic acids other than lactic acids may be used.

Further, besides aliphatic dicarboxylic acid units and aliphatic diol units and small-amount copolymerizing components, as other small-amount copolymerizing monomers, lactic acids and/or hydroxycarboxylic acid units other than lactic acids may be used.

The weight-average molecular weight of the predetermined aliphatic polyester is desirably 20000 to 300000, and preferably 100000 to 250000. If it is smaller than 20000, the properties as the polymer will be inferior, and in particular, not only will the heat-sealability not improve, but such trouble as bleeding onto the film surface with time will occur. Also, if it is larger than 300000, the melt viscosity will be too high, so that extrusion formability will lower when formed into a film.

For the purpose of adjusting it to such a molecular weight, a small amount of a chain extender may be used after polymerizing it to the degree of an oligomer as described above. As a chain extender, a compound having two or more functional groups which react with carboxyl groups or hydroxy groups which will become the terminal structure of the aliphatic polyester may be used. As representative examples, there are diisocyanate compounds such as tolylene-2,4-diisocyanate, tolylene-2,6-diisocyanate, 4,4-diphenylmethanediisocyanate and hexamethylenediisocyanate, and diphenol compounds such as bisphenol A. When they react, they are contained in the polymer structure as urethane-bond residue and carbonate-bond residue. The rate at which they are contained in the structure should be up to 5% of the weight-average molecular weight. If over 5%, properties as the aliphatic polyester (crystallizability, melting point, physical properties, biodegradability, etc.) will be impaired.

From the viewpoint of shock resistance and cold resistance, the glass transition point (Tg) is preferably 0° C. or under.

As especially preferable aliphatic polyesters, for example, polyethylene suberate, polyethylene sebacate, polyethylene decanedicarboxylate, polybutylene succinate, polybutylene adipate, polybutylene sebacate, polybutylene succinate/adipate and their copolymers can be cited. Most preferably, a copolymer of which the major components are 1,4-butanediol, succinic acid and adipic acid can be cited.

In order to adjust the predetermined aliphatic polyester, a known method such as direct method or indirect method may be used. For example, in direct method, an aliphatic carboxylic acid component and an aliphatic alcohol component are directly polymerized to obtain a high-molecular weight product while removing moisture contained in these components or produced during polymerizing. In indirect method, after polymerizing them to the degree of an oligomer, a high-molecular weight product is obtained by use of a small amount of a chain extender as with the polylactic acid-family polymer.

Aliphatic polyesters used in this invention include, besides the abovementioned aliphatic polyester (hereinafter referred to as "first aliphatic polyester"), block copolymers of the abovementioned polylactic acid-family polymer and the first aliphatic polyester (including its partial ester exchange products and products containing a small amount of chain extender residue).

Such block copolymers may be adjusted by a desired method. For example, one of the polylatic acid-family polymer and the first aliphatic polyester may be separately prepared as a polymer, and in the presence of this polymer, a monomer of the other of them is polymerized. Ordinarily, by polymerizing a lactide in the presence of an aliphhatic polyester which has been prepared beforehand, a block copolymer of a polylactic acid and an aliphatic polyester is obtained. Basically, polymerization may be carried out in the same manner as when a polylactic acid-family polymer is adjusted by the lactide method except that an aliphatic polyester coexists. At this time, simultaneously with the progression of polymerization of the lactide, ester exchange reaction occurs to an appropriate degree between the polylactic acid and the aliphatic polyester, so that a copolymer having a relatively high randomness is obtained. If an aliphatic polyester urethane having a urethane bond is used as a starting substance, an ester-amide exchange is also produced.

The crystallizing melting heat $\Delta$ Hm of the aliphatic polyester is preferably $45 \leq \Delta$ Hm $\leq 55$. If it is too low, the molten resin would adhere to casting rolls when it is drawn and cooled. If it is too high, though depending upon the thickness, the film would turn white and transparency would be lost, so that its use is limited. In the present invention, the crystallizing melting heat is fusion heat of a film test piece determined in the differential scanning calorimetry (DSC) under JIS-K7122.

For the purpose of adjusting various physical properties, various additives, specifically, heat stabilizers, light stabilizers, light absorbers, lubricants, plasticizers, inorganic fillers, colorants, pigments, etc. may be added.

Next, description is made about a method of forming a film of the polylactic acid-family polymer and a film of the predetermined aliphatic polyester.

As a method of manufacturing a biaxially oriented film of which the major component is the above polylactic acid-family polymer, a method may be used in which after a sheet-like product or a cylindrical product extruded from a T-die, I-die or round die has been solidified in a state close to amorphous by quenching it by use of cooling cast rolls, water, pressurized air, etc., it is biaxially oriented by the roll method, tenter method, tubular method, etc.

For the manufacture of a biaxially oriented film, a successive biaxially orienting method in which the longitudinal orientation is carried out by a roll method and lateral orientation by a tenter method, or a simultaneous biaxial orienting method in which longitudinal and lateral orientations are simultaneously carried out by use of a tenter is normally used.

Orienting conditions may be selected within the range of 1.5–6 times in the longitudinal direction and 1.5–6 times in the lateral direction. In particular, in view of the film strength and accuracy of thickness, orienting is preferably twice or over both in longitudinal and lateral directions, and the area orienting magnification obtained by multiplying the longitudinal and lateral orienting magnifications is preferably 6.5 times or over.

In the successive biaxially orienting method, the longitudinal orienting temperature is preferably 70–90° C. and the lateral orienting temperature is preferably 70–80° C. In the simultaneous biaxially orienting method, because it is contained in the successive biaxially orienting method, orientation is preferably carried out at the orienting temperature within the range of 70–80° C. If the orienting magnification and the orienting temperature are not within the abovesaid ranges, the accuracy of thickness of the film obtained tends to be extremely low. This tendency is especially remarkable with a film that is heat-treated after orientation.

For a biodegradable film of which the major component is the predetermined aliphatic polyester, a method is normally employed in which the film is directly formed by extruding the material composition through a mouth ring. If a small amount of additive is mixed, it may be mixed in a kneading device such as a unidirectional twin-screw extruder, and then extruded in strands, cut into pellets, dried and formed to a film. Or else, the pellets may be thinned by mixing with pellets to which are added no additives, and the mixture be dumped into an extruder to form into film. In either case, lowering of the molecular weight due to decomposition has to be taken into account. For uniform mixing, the latter method is preferable.

Each component of the raw materials used for a biaxially oriented film of which the major component is a polylactic acid-family polymer and a film of which the major component is the predetermined aliphatic polyester should be sufficiently dried to remove moisture and then melted in an extruder. The melt-extruding temperature is suitably selected taking into account the melting point of each composition. Practically, the range of 100–250° C. is selected.

The biaxially oriented film of which the major component is a polylactic acid-family polymer and the film of which the major component is the predetermined aliphatic polyester both have a light beam transmission of preferably 85% or over from the viewpoint that it is used instead of soft vinyl chloride and polyolefins for applications such as pouches, paper lamination, and stretch film. It is especially preferably 90% or over, and more preferably 95% or over.

As a method of laminating the biaxially oriented film of which the major component is a polylactic acid-family polymer and the film of which the major component is the predetermined aliphatic polyester, they may be laminated together with an adhesive, or the two films, which are at suitable temperature, may be heat-pressed by hot plates or rolls, or the material forming one film may be extruded on the other film.

The obtained laminate has transparency and degradability in the natural environment.

From the obtained laminate, a biodegradable bag can be manufactured by heat-sealing the ends of two films with the biaxially oriented film of which the major component is a polylactic acid-family polymer as the outer layer and the film of which the major component is the predetermined aliphatic polyester as the inner layer. Since the latter film is the inner layer, the heat sealing is done between the films of which the major component is the predetermined aliphatic polyester. Thus, heat sealing at a low temperature is possible. Specifically, heat sealing is possible at 100–150° C. Also, even if heat sealing is done, corrugation will not develop at this portion.

If a repeatedly openable zipper is provided at the mouth of the bag, articles can be repeatedly put in and taken out of the bag. Such a bag is convenient. Such a zipper is preferably provided on the inner layer of the bag. As a method of providing the zipper on the inner layer, there are a method in which recess and protrusion portions of the zipper are extruded onto and melt-bonded to the inner-layer film, a method in which the zipper is heat-sealed to the inner-layer film, a method of bonding it with an adhesive, etc.

The zipper in the present invention is not specifically limited as long as it is made of a biodegradable resin. But one whose major component is the above-described polylactic acid-family polymer, the above predetermined aliphatic polyester or their mixture is preferable. If the aliphatic polyester which is the major component forming the inner layer, and the aliphatic polyester which is the major component forming the zipper are of the same kind, they can be easily bonded together by heat sealing. Thus, it is especially preferable that it has as its major component the above predetermined aliphatic polyester.

The biodegradable bag can be used for a bag for garments, stationery, fishing tools, etc.

EXAMPLES

Examples are shown below. But the present invention is not limited to them. Measurements and evaluations shown in the Examples are carried out under the following conditions.

(1) Crystallizing Melting Calorie ($\Delta$ Hm)

Using a differential scanning calorimeter DSC-7 made by Perkin Elmer, under JIS-K7122, melting heat was measured. After state-adjusting 10 mg of film specimens in a standard state, from a DSC curve drawn while the temperature was being raised to 200° C. with the nitrogen gas flow rate of 25 ml/minute and temperature raising rate of 10° C./minute, the encothermic peak area was read as $\Delta$ Hm (J/g).

(2) Tackiness Evaluation During Manufacture

Into a single-screw extruder of 40 mm diameter, a composition in which a predetermined molten resin and additives are mixed together was put, and films having a thickness of 20–50 $\mu$m were melt-extruded from a T-die having a lip width of 300 mm, and taken off while cooling by bringing them in contact with water circulating type internally cooled metallic rolls (casting rolls) in which the temperature was set at 25° C. It was observed how the films adhered, and films having a tendency to adhere to the casting rolls were indicated by x and films having no such a tendency were indicated by ○.

The manufacturing conditions were suitably adjusted taking into account e.g. melt viscosity and were as follows:
Extrusion set temperature: 140–200° C.
Extruding amount: 10 kg/h
Take-off speed: 1–2 m/min (3) Transparency Light beam transmittance under JIS K7105 was measured, and ones showing a light transmittance of 85% or over were indicated by ○ and ones that did not exceed 85% were indicated by x. Those showing a light transmittance of 85% or over show that they are superior in transparency.

(4) Manufacture and Finish of Heat-Sealed Bags

Using films (laminated films in the present Examples), bags as shown in FIG. 1 were manufactured. First, film (laminated film in the Examples) were cut to 150 mm wide and 128 mm long. Such two films were superposed so that the aliphatic polyester surfaces as heat sealant members will contact each other. Between the superposed surfaces, a zipper 1 made of an aliphatic polyester which was a combination of a recess and a protrusion were incorporated. The zipper 1 was set 22 mm inside of the end which was to be the opening of the bag. The three sides of the superposed film were sealed to form seal portions 3. On the other hand, the end at which the zipper 1 was provided, i.e. the end close to an opening mouth 2 was left open so that it can be opened by the zipper 1. The sealing conditions for the sealed portions 3 were: heating bar width of 5 mm and pressure of 1.5 kgf/cm². After the heating bar suitably set between 100 and 150° C. was pressed for about 3 seconds, the bag was let to cool. The bags obtained were observed, and ones having the heat-sealed portions slightly shrunk by heat, flatness lost as a whole, and poor finish were indicated by x and one having little shrinkage and good finish were indicated by ○.

Temperatures at which the sealed portions of the bags obtained began to fuse were recorded and compared. Especially at higher temperature, the longer cooling time is needed with a practical heat-sealing type bag-making machine, so that productivity per unit time lowers.

Example 1

Manufacture of Aliphatic Polyester Film

Polybutylene succinate/adipate (trade name: Bionolle #3003, SHOWA High polymer Co.,Ltd), and polybutylene succinate (trade name: Bionolle #1001, SHOWA High polymer Co.,Ltd), which were both aliphatic polyesters, were mixed at the rate of 80:20 in weight ratio, sufficiently dried, melted in a single-screw extruder of 40 mm diameter, extruded through a T-die having a lip width of 500 mm, and taken up while cooling by bringing into contact with casting rolls having their temperature set at 30° C. by a warm water circulator to manufacture a film having a thickness of 30 $\mu$m.

The film was slit to a width of 360 mm, and taken up continuously. For the film alone, $\Delta$ Hm, tackiness and transparency were measured by the above methods. The evaluation thereof is shown in Table 1.

Method of Manufacturing a Biaxially Oriented Film of Polylactic Acid

A polylactic acid having a weight-average molecular weight of 200 thousand (made by Cargill-Dow Polymers LLC, trade name: EcoPLA4040D (lot No. MJ0328P103)) and 1 part by weight of a particulate silicon dioxide (silica) (trade name: Sylysia 430) having an average particle diameter of about 2.5 $\mu$m and made by Fuji Silysia Chemical Ltd. were dried to sufficiently remove moisture, put in a unidirectional twin-screw extruder having a 40 mm diameter, melt-mixed while setting at about 200° C., extruded in strands, and cut to pellets while cooling. As a master batch, the pellets were dried again, mixed by 10% into the above-mentioned polylactic acid, which was also dried, put in a unidirectional twin-screw extruder having a 40 mm diameter, extruded in a sheet at the temperature of 210° C., and quenched and solidified in a revolving cooling drum to obtain a practically amorphous sheet. The obtained sheet was heated by use of an infrared heater while bringing it into contact with a warm water circulating type roll, oriented between peripheral speed difference rolls by 3.0 times in the longitudinal direction at 77° C. and then by 3. 0 times in the vertical direction of the film flow at 75° C. by guiding the longitudinally oriented sheet into a tenter while gripping it with a clip, and heated for about 15 seconds at 135° C. to manufacture a film having a thickness of 25 $\mu$m. The film was slit to the width of 340 mm and taken up continuously.

Lamination

One side of each of both films obtained was subjected to corona treatment at the intensity of 50 W/m²/min to improve wet tension on the surface. The higher the intensity of corona treatment, the higher the wet tension. But if it is too high, there would arise a problem such as melting of the surface of the film during treatment and the appearance is impaired. The treating intensity of 50 W/m²/min is the most effective within the range at which the appearance of the film is not impaired. For reference, the treating intensity for a polyolefin-family film is generally 20–40 W/m²/min and 500 W/m²/min at the most.

The two films were laminated together with an adhesive by use of a dry laminator. The polylactic acid-family oriented film, which was to be the outer layer, was unrolled, an adhesive was applied to its corona-treated surface by use of a coating roll, and the solvent component of the adhesive was volatilized in a drying furnace set at 60° C. This film was superposed on the corona-treated surface of the unrolled aliphatic polyester film, pressed by heating rolls set at 60° C. and taken up. The taken-up laminated film was subjected to aging at 40° C. for two days to promote hardening of the adhesive. As the adhesive, an adhesive for dry laminating aliphatic polyester (TAKELAC A-315/TAKENATE A-50 (ratio 15/1) made by Takeda Chemical Industry) was used.

Heat sealability of the laminate obtained was evaluated by the above method. The results are shown in Table 1.

Example 2

Polybutylene succinate/adipate (trade name: Bionolle #3003 made by SHOWA High polymer Co.,Ltd), and polybutylene succinate (trade name: Bionolle #1001 made by SHOWA High polymer Co.,Ltd), which were both aliphatic polyesters, were mixed at the rate of 80:20 in weight ratio, and ethylenebisstearate amide (trade name: KAO wax EB-FF made by KAO Corporation) was added by 0.02 parts by weight as an additive for anti-blocking. The mixture was put in a unidirectional twin-screw extruder of 25 mm diameter, melt-mixed at 190° C., extruded into a water bath in strands, and finely cut to pellets. The pellets were dried in a dehumidifying dryer to remove moisture, melted in a single-screw extruder of 40 mm diameter, extruded through a T-die having a lip width of 500 mm, and cooled while bringing into contact with casting rolls having their temperature set at 30° C. by use of a warm water circulator and taken up to manufacture a film having a thickness of 30 µm. Then, films and bags were obtained in the same manner as in Example 1. Results are shown in Table 1.

Example 3, Comparative Examples 1–5

Except that the aliphatic polyesters and additives described in Table 1 were used, films and bags were obtained in the same manner as in Example 1. But in Comparative Example 5, inflation-formed films were obtained. Results are shown in Table 1.

Bionolle #1001 and Bionolle #1030 are trade names of products made by SHOWA High polymer Co.,Ltd.

Comparative Example 6

As films, low-density polyethylene (LDPE, thickness: 30 µm) was laminated on a polyethylene terephthalate (PET, thickness: 17 µm) film in the same manner as in Example 1. Next, an inflation-formed film was obtained. Results are shown in Table 1.

INDUSTRIAL APPLICATION

According to this invention, it is possible to heat-seal at low temperature and improve efficiency of heat sealing.

Also, since no corrugation develops even when heat-sealed, the biodegradable bag obtained looks beautiful.

Further, the biodegradable bag obtained has transparency and biodegradability in the natural environment.

Still further, since the biodegradable bag in accordance with this invention has an inner layer in the form of a film of which the major component is an aliphatic polyester, in the step of sealing by fusing the aliphatic polyester film, the fusing temperature is fairly lower than the melting point of the polylactic acid-family polymer in the outer layer. Thus, in the sealing step, no melting of the biaxially oriented film of the outer layer, of which the major component is the polylactic acid-family polymer, will not occur. Thus no corrugation will develop at the fused portion of the biodegradable bag obtained.

TABLE 1

|  |  |  | Example | | | Comparative Example | | | | | |
|---|---|---|---|---|---|---|---|---|---|---|---|
|  |  |  | 1 | 2 | 3 | 1 | 2 | 3 | 4 | 5 | 6 |
| Thickness of film of polylactic acid polymer (µm) | | | 25 | 25 | 25 | 25 | 25 | 25 | 25 | 25 | |
| Aliphatic polyester film | Aliphatic polyester | Bionolle #3003 (part) | 80 | 80 | 40 | 100 | 100 | 20 | | 40 | |
| | | Bionolle #3030 (part) | | | | | | | 60 | | |
| | | Bionolle #1001 (part) | 20 | 20 | 60 | | | 80 | | 60 | |
| | | Bionolle #1030 (part) | | | | | | | 40 | | |
| Additive (part) | | | | 0.02 | | | 0.02 | | | | |
| Thickness (µm) | | | 30 | 30 | 30 | 30 | 30 | 30 | 30 | 30 | |
| PET film (µm) | | | | | | | | | | | 17 |
| LDPE film (µm) | | | | | | | | | | | 30 |
| How to form film | cast forming | | ○ | ○ | ○ | ○ | ○ | ○ | ○ | | |
| | inflation forming | | | | | | | | | ○ | ○ |
| Evaluation | ΔHm (J/g) | | 46 | 47 | 53 | 43 | 44 | 56 | 61 | 57 | — |
| | Tackiness | | ○ | ○ | ○ | X | X | ○ | ○ | ○ | — |
| | Transparency | | ○ | ○ | ○ | ○ | ○ | X | X | X | ○ |
| | Heat sealability | | ○ | ○ | ○ | X | X | ○ | ○ | ○ | ○ |
| Total evaluation | | | ○ | ○ | ○ | X | X | X | X | X | ※1 |

※1: was not biodegradable.

What is claimed is:

1. A biodegradable bag comprising a laminate of a biaxially oriented film of which the major component is a polylactic acid-family polymer, and a film consisting of aliphatic polyesters having the structure of formula (1) below and having a crystallizing melting heat Δ Hm (J/g) of 45≦Δ Hm≦55, wherein said biaxially oriented film is biaxially oriented by a successive orienting method in which longitudinal orientation is carried out by a roll method and lateral orientation is carried out by a tenter method, or by a simultaneous biaxially orienting method in which longitudinal and lateral orientations are simultaneously carried out by use of a tenter, said bag being made by heat-sealing said laminates so that said biaxially oriented film of which the major component is a polylactic acid-family polymer will be an outer layer,

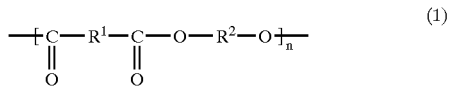
(1)

wherein $R^1$ and $R^2$ are alkylene groups or cycloalkylene groups having a carbon number of 2–10, n is the degree of polymerization necessary for the weight-average molecular weight to be 20000 to 300000, n $R^1$'s and $R^2$'s may be the same or different, and in the formula, instead of the ester-bond residue, urethane-bond residue and/or carbonate-bond residue may be contained by up to 5% of the weight-average molecular weight.

2. The biodegradable bag as claimed in claim 1 wherein a zipper made of a biodegradable resin is provided at the mouth portion thereof, and said biodegradable resin contains as the major component a polylactic acid-family polymer, an aliphatic polyester having the structure of the formula (1) in claim 1, or a mixture thereof.

3. The biodegradable bag as claimed in claim 1 wherein said aliphatic polyesters are copolymers of which the major components are 1,4-butanediol, succinic acid, and adipic acid.

4. The biodegradable bag as claimed in claim 2 wherein said aliphatic polyesters in the film are copolymers of which the major components are 1,4-butanediol, succinic acid, and adipic acid.

* * * * *